United States Patent [19]

Robinson et al.

[11] Patent Number: 5,647,687
[45] Date of Patent: Jul. 15, 1997

[54] TOE KICK END CAP FOR CABINETS

[75] Inventors: Michael V. Robinson; Thomas W. Alkire, both of Capon Bridge, W. Va.

[73] Assignee: American Woodmark Corporation, Winchester, Va.

[21] Appl. No.: 553,983

[22] Filed: Nov. 6, 1995

[51] Int. Cl.[6] ..................................... F16B 12/44
[52] U.S. Cl. .................... 403/403; 403/231; 312/278; 312/228
[58] Field of Search ...................... 403/403, 293, 403/295, 292, 231; 312/278, 236, 204, 228, 293.1, 293.3, 265.6, 111

[56] References Cited

U.S. PATENT DOCUMENTS

| | | | |
|---|---|---|---|
| 1,870,132 | 8/1932 | Miller | 403/231 |
| 3,831,338 | 8/1974 | Klingensmith et al. | 403/231 X |
| 4,103,375 | 8/1978 | Santo . | |
| 4,191,439 | 3/1980 | Cohen . | |
| 4,381,876 | 5/1983 | Fenwick | 312/111 X |
| 4,383,397 | 5/1983 | Ward . | |
| 4,436,343 | 3/1984 | Schneider . | |
| 4,477,201 | 10/1984 | Yoshiyuji . | |
| 4,712,942 | 12/1987 | Brown . | |
| 4,724,561 | 2/1988 | Falwell et al. | 403/403 X |
| 4,883,303 | 11/1989 | Gross | 403/403 X |
| 4,973,187 | 11/1990 | Sauder . | |
| 4,974,352 | 12/1990 | Chen . | |
| 5,186,571 | 2/1993 | Hentzschel | 403/403 X |

*Primary Examiner*—Harry C. Kim
*Assistant Examiner*—William L. Miller
*Attorney, Agent, or Firm*—Laubscher & Laubscher

[57] ABSTRACT

A pair of end cap connectors serve to connect a vertical toe kick plate between the spaced vertical side walls of a kitchen base cabinet, or the like. Each end cap connector includes a body portion adapted to abut the front edge of the associated side panel, a first flange portion extending orthogonally from the body portion to engage the corresponding inner surface of the associated side wall, and an abutment surface parallel with the first flange portion for covering the corresponding end surface of the toe kick plate.

5 Claims, 3 Drawing Sheets

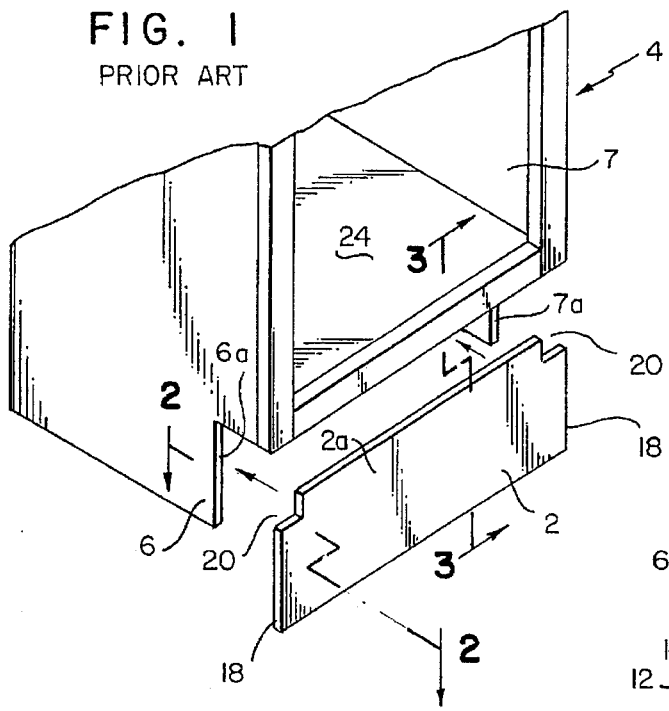
FIG. 1
PRIOR ART
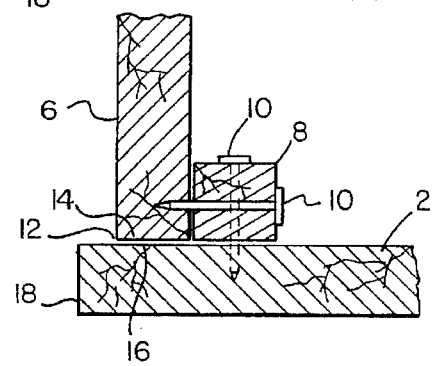
FIG. 2
PRIOR ART
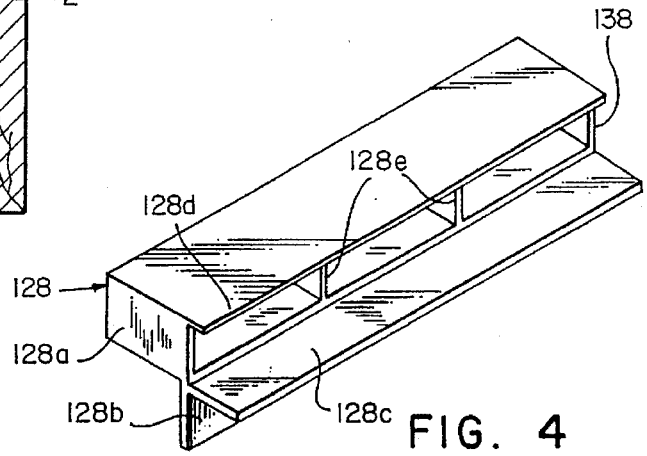
FIG. 3
PRIOR ART
FIG. 4

TOE KICK END CAP FOR CABINETS

BACKGROUND OF THE INVENTION

This invention relates to an end cap connector for joining a vertical toe kick plate between the spaced vertical side walls of a kitchen or bathroom base cabinet, vanity or the like.

BRIEF DESCRIPTION OF THE PRIOR ART

Connectors for joining two or more panels are known in the patented prior art. The U.S. Pat. No. 4,712,942, to Brown for example, discloses a joint maker or connector for assembling two or more pieces of stock. This connector includes pairs of arms which straddle the members of stock to be joined and includes inwardly directed cleats on the arms which slide into corresponding grooves contained in the stock.

The U.S. Pat. No. 4,383,397 to Ward discloses a connecting member for connecting panels to form corner joints in furniture or cupboards. This connector has a cruciform shaped cross-section forming four longitudinally extending webs which define four V-section channels. One of these V-section channels may be filled with a filling member which is be secured in place either by adhesive or screws.

While the prior connectors are functionally adequate, the need exists for a connector which can be easily and inexpensively fabricated, is easy to install, and which protects the panels against damage from contact with foreign objects. This is particularly important in the cabinet making industry, where the mounting of a cabinet toe plate between the cabinet side walls presents a problem owing to the difficulty in accurately notching and mounting the toe plate, and the extra cost of painting or decoratively covering the exposed toe plate edges. The present invention was developed to overcome these and other drawbacks of the prior art devices by providing a pair of end caps for efficiently and accurately connecting a toe kick plate with the side walls of a cabinet, and for decoratively covering the exposed end surfaces of the toe plate.

SUMMARY OF THE INVENTION

Accordingly, a primary object of the present invention is to provide an end cap connector for accurately aligning and joining a baseboard toe kick plate with the side walls of a base cabinet, and for decoratively covering the exposed ends of the toe kick plate.

According to a more specific object of the invention, there is provided a pair of end caps, each end cap including a body portion adapted to abut the front edge of the associated cabinet side walls, at least one flange portion adapted to be fastened to the inner surface of the side wall, and means for defining an abutment end surface which is engaged by, and decoratively covers, the end of the toe kick plate.

It is a further object of the present invention to provide an end cap connector which can be produced inexpensively, which is easy to install, and which provides a tight seal between the toe kick plate and the adjacent cabinet side and bottom walls.

Still another object of the present invention is to provide an end cap connector which eliminates the need to finish the end surfaces of the toe kick baseboard and which allows the machining operation used to produce the toe kick plate to be simplified and, more particularly, which eliminates the need to notch the toe kick plate, thereby reducing labor and material manufacturing costs.

According to a more specific object of the invention, in a preferred embodiment, the end cap connectors define guide means which allow the toe kick plate to slide into position where it is frictionally held, thereby eliminating the need for additional fasteners.

It is a yet further object of the present invention to provide a connector which protects the toe kick plate and cabinet from damage caused by contact with foreign objects, and which permits sliding of the cabinet relative to the floor during cabinet installation.

BRIEF DESCRIPTION OF THE DRAWINGS

Other objects and advantages of the invention will become apparent from a study of the following specification when viewed in light of the accompanying drawings, in which:

FIG. 1 is a perspective view of the customary prior art method for connecting a toe kick plate to a base cabinet;

FIG. 2 is a detailed horizontal sectional view of the prior art connection taken along line 2—2 of FIG. 1;

FIG. 3 is a detailed vertical sectional view taken along line 3—3 of FIG. 1;

FIG. 4 is a perspective view of the improved end connector according to the present invention;

DETAILED DESCRIPTION

Figure 5:
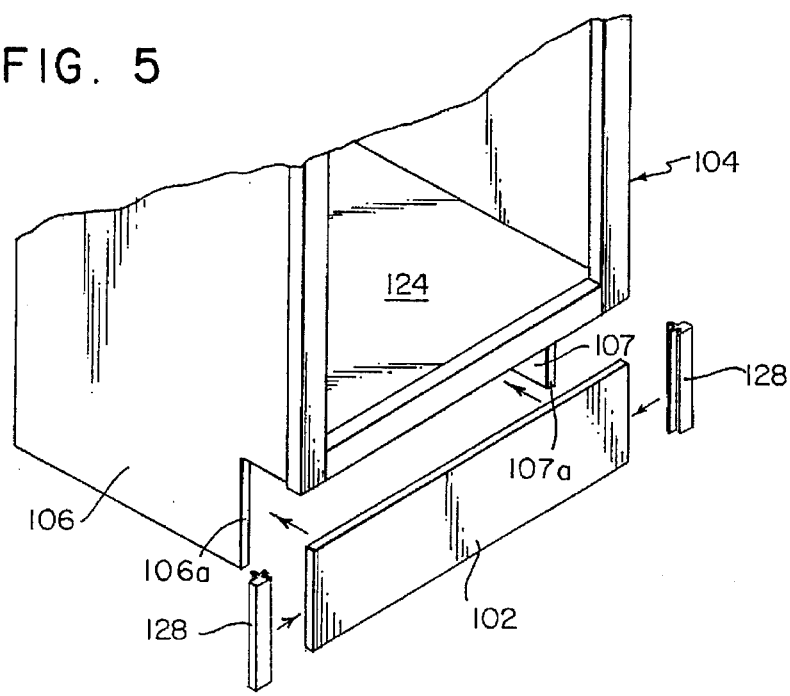
FIG. 5 is a perspective view illustrating the use of the connector of FIG. 4 for connecting a toe kick plate to a base cabinet.

Referring first to FIGS. 1-3, it is customary in the kitchen cabinet and bathroom vanity art to provide a toe kick plate 2 on a base cabinet 4 having a pair of parallel spaced vertical side walls 6 and 7 leaving vertical recessed surfaces 6a, 7a to which the kick plate is secured. This is accomplished by positioning an elongated rectangular block 8 in the angle formed between the cabinet side wall and the toe kick plate and securing the block to both the side wall and toe kick plate using a plurality of alternately facing fasteners 10.

This method, however, often produces an uneven connection resulting in undesirable open spaces or gaps 12 between front edge 14 of the side wall and inner surface 16 of the toe kick plate, and between the horizontal top edge 17 of the toe plate and the adjacent surface 25 of the bottom wall 24 of the cabinet. A tight connection is particularly important to prevent rodents or insects from entering the cabinet. This method also leaves unfinished edges 18 of the toe kick plate exposed, thereby necessitating an additional painting or finishing step to the cabinet manufacture. Moreover, this prior method requires the toe kick plate to be provided with notches 20 which define an upwardly projecting notch portion 2a which fits between the side walls and engages the underside 25 of bottom panel 24 of the cabinet which includes an overhanging portion 24a.

Referring now to FIGS. 4-7, in accordance with the present invention improved connector means 128 are provided for connecting a wooden toe plate 102 between the side walls 106 and 107 of a wooden base cabinet 104.

Figure 7:
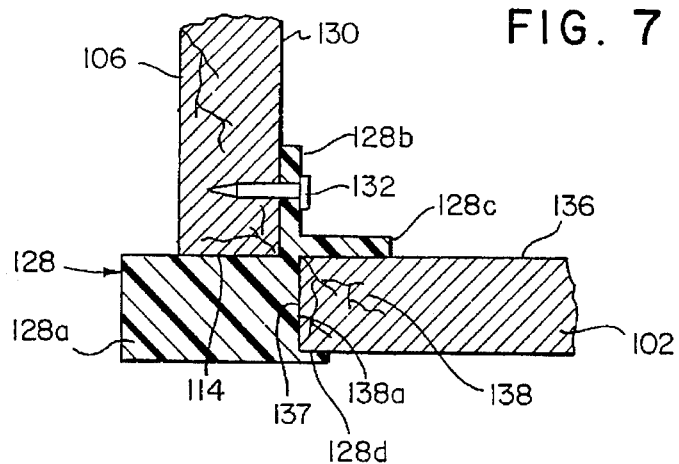
FIG. 7 is a detailed horizontal sectional view of the use of the connector of FIG. 4 in connecting one end of a toe kick plate to the associated cabinet side wall.

As best shown in FIG. 7, each end cap connector includes a body portion 128a adapted to abut the front edge 114 of the associated side wall 106. Extending orthogonally from the body portion is a first flange portion 128b which engages the inner surface 130 of the corresponding side wall and is rigidly secured thereto by a plurality of nail, screw or staple fasteners 132.

A second flange portion 128c extends orthogonally from the first flange portion 128b for engagement by the inner surface 136 of the toe kick plate 102.

The connector body portion 128a also includes a retaining portion 128d laterally spaced from and extending parallel with the second flange portion, thereby to define a slot 138 for slidably receiving the adjacent end of the toe kick plate 102, the bottom wall 138a of the slot defining a surface covering the exposed end 137 of the toe kick plate. In this manner, when the base cabinet is inverted and the flange portion 128b is fastened to the inner wall surface 130 of side wall 106, the toe kick plate 102 may be slidably introduced into the slot 138 and is held in place by frictional forces, whereby once the cabinet is reinverted and placed in position on the floor, any movement of the toe kick plate relative to the cabinet is prevented.

Preferably, the end connector 128 is molded from a suitable rigid synthetic plastic material, such as polyethylene, polypropylene or the like. As shown in FIG. 4, the body portion 128a may be hollow and be provided with internal reinforcing struts 128e. By causing the lower extremity of the end cap connector to extend to a level slightly below the lower edge of the side wall, the end cap connector will also serve as glide means for sliding the cabinet on the floor during cabinet installation.

Figure 6:
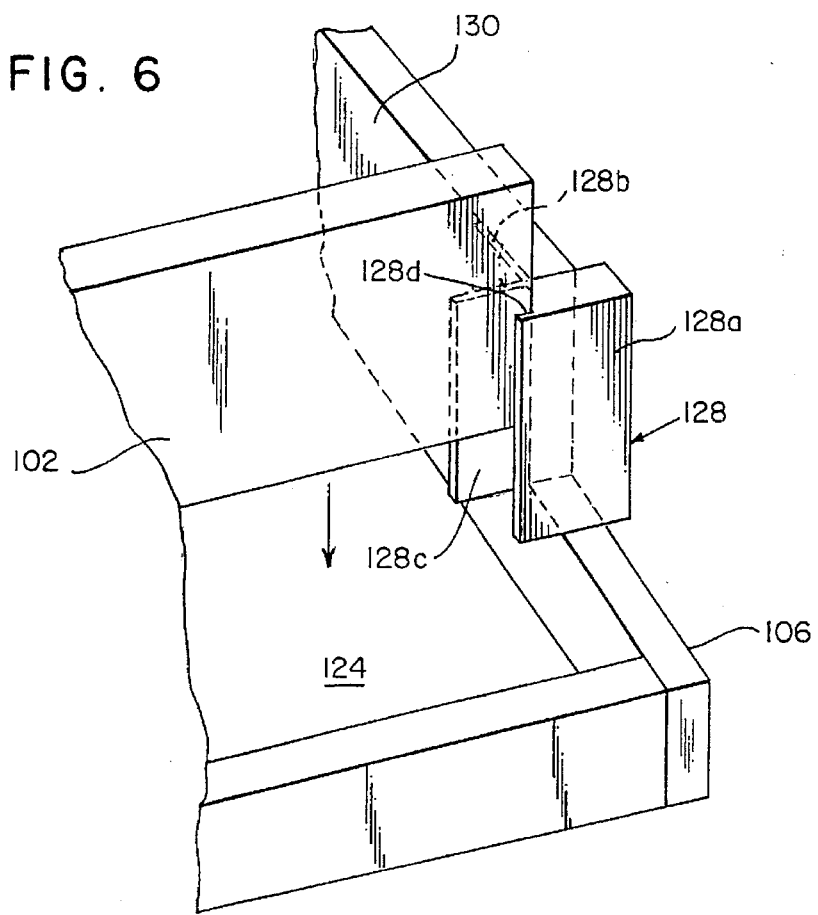
FIG. 6 is a detailed perspective view illustrating the inverted sliding connection of the toe plate of FIG. 5 to a base cabinet.

As shown in FIG. 6, the connector 128 greatly simplifies the assembly of the base cabinet by eliminating the awkward nailing step required by the prior method. It will be recognized that assembly of the toe kick plate 102 is most easily accomplished when the cabinet is turned upside down. The connector is then installed by first fastening the connector to the corresponding side wall 106 of the cabinet and then simply sliding the toe plate into place. Because the connector is manufactured to a high tolerance, this can be accomplished by hand.

Figure 8:
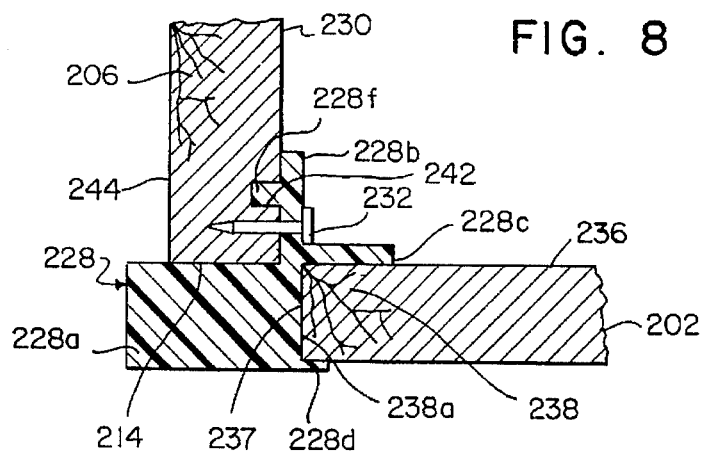
FIG. 8 is a detailed horizontal sectional view of a second embodiment of the invention.

Referring now to the modification illustrated in FIG. 8, the first flange portion 228b is provided with a stabilizing rib 228f which is received by a corresponding slot 242 contained in the inner surface 230 of the side wall. It should be noted that the body portion 228a of the end cap connector extends beyond outer surface 244 of the side wall to provide added protection for the side walls. This also serves as a spacer means for spacing side-by-side cabinets during the installation thereof.

Figure 9:
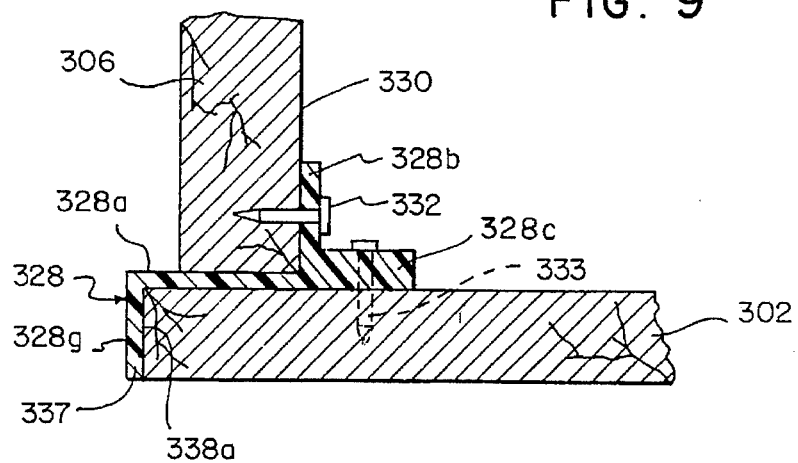
FIG. 9 is a detailed horizontal sectional view of a third embodiment of the invention.

FIG. 9 illustrates an embodiment of the invention in which the toe kick plate 302 extends beyond the outer surface of the side wall 306. The unfinished end of the toe kick plate 302 abuts a decorative flange portion 328g of the connector that extends orthogonally from the body portion 328, thereby to decoratively cover the exposed end edge surface 337 of the toe kick plate. The toe kick plate is secured to the toe connector in any suitable conventional manner, such as by gluing or by using a plurality of conventional mechanical fasteners 333.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. End cap means for connecting a vertical toe kick plate between two spaced vertical side walls of a kitchen base cabinet, comprising: a pair of end cap connectors (128, 228) associated with the cabinet side walls, respectively, each of said end cap connectors including:

(a) a vertically extending cap body (128a, 228a) adapted to abut a vertical front surface on the associated cabinet side wall;

(b) a first flange portion (128b; 228b) extending rearwardly from said cap body adjacent an inner surface of the associated side wall;

(c) means connecting said first flange portion with the associated side wall;

(d) a second flange portion (128c; 228c) extending from said cap body orthogonally relative to said first flange portion adjacent and parallel with a rear surface of said toe kick plate; and (e) a retaining portion (128d, 228d) laterally spaced from and extending parallel with said second flange portion adjacent the front surface of said toe kick plate, thereby to define a slot (138, 238) for slidably receiving an associated end portion of said toe kick plate;

(f) a surface of said cap body that is adapted to engage said vertical front surface of said cabinet side wall being collinear with a surface of said second flange portion that is adapted to engage the rear surface of the toe kick plate.

2. End cap means as defined in claim 1, wherein said first flange portion includes a projecting rib (228f) that is adapted to extend within a corresponding groove contained in the inner surface of the associated side wall.

3. End cap means as defined in claim 1, wherein each of said end cap connectors is formed from a synthetic plastic material.

4. End cap means as defined in claim 3, wherein said cap body portion is hollow and includes at least one internal reinforcing rib.

5. A base cabinet, comprising:

(a) a pair of vertical parallel spaced side walls (106, 107) each having a horizontal bottom edge, vertical front and rear edges, and a lower front portion containing a recess having a recessed vertical edge (106a, 107a);

(b) a horizontal bottom wall (124) connected between said side walls at an elevation above said side wall recesses;

(c) a vertical toe kick plate (102) extending between said side walls, said toe kick plate having a pair of end portions adjacent said recessed vertical edges, respectively; and (d) toe kick plate connecting means connecting said toe kick plate end portions with said side wall recessed vertical edges, respectively, said toe kick plate connecting means comprising a pair of end cap connectors (128; 228) associated with said side walls, respectively, each of said end cap connectors including:

(1) a vertically extending cap body (128a; 228a;) in abutting engagement with the associated recessed vertical edge;

(2) a first flange portion (128b; 228b) extending rearwardly from said cap body adjacent an inner surface of the associated side wall;

(3) means connecting said first flange portion with the associated side wall;
(4) a second flange portion (128c; 228c) extending from said cap body orthogonally relative to said first flange portion adjacent and parallel with a rear surface of said toe kick plate; and
(5) a retaining portion (128d, 228d) laterally spaced from and extending parallel with said second flange portion adjacent a front surface of said toe kick plate, thereby to define a slot (138, 238) for slidably receiving the associated end portion of said toe kick plate:
(6) said cap body extending laterally outwardly a slight distance beyond the associated side wall, thereby to define spacer means for laterally spacing said cabinet from an adjacent cabinet.

\* \* \* \* \*